United States Patent Office
3,181,343
Patented May 4, 1965

3,181,343
METHOD AND ARRANGEMENT FOR MEASURING CONTINUOUSLY THE CHANGE OF THE CARBON CONTENT OF A BATH OF MOLTEN METAL
Jacques Dumont Fillon, Metz-Queuleu, France, assignor to Institut de Recherches de la Sidérurgie Française, St. Germain-en-Laye, France
Filed July 24, 1962, Ser. No. 211,999
Claims priority, application France, Aug. 5, 1961, 870,286, Patent 1,309,212; Mar. 13, 1962, 890,868, Patent 81,514; Mar. 14, 1962, 891,032, Patent 1,325,024
25 Claims. (Cl. 73—23)

The present invention refers to the art of decarburizing a bath of molten metal as for instance by introducing into the bath oxygen or an oxygen-containing medium.

In carrying out such a process for instance by introducing oxygen into a bath of molten iron for producing steel containing a certain percentage of carbon, one knows, in the conventional execution of this process, only the percentage of carbon contained in the bath at the time when the decarburization vessel or converter is filled with the starting material, or from samples of the molten metal which are occasionally removed from the converter and which are subsequently subjected to a test in a device determinating the carbon content or simply to chemical analysis.

The conventional procedure entails substantial delays until the results are available, and also the changes in the carbon content of the bath or of the development of the decarburization can only be estimated roughly. It is therefore evident that in the same manner as continually measuring the temperature of the bath of molten metal, it would be of great interest and advantage in the operation of a decarburization process to be able to observe from moment to moment the course and development of the decarburization and to obtain continuously a measurement of the varying carbon content of the bath. Obviously this cannot be done except in an indirect manner because a continuous analysis of the molten metal is impractical and impossible.

It is therefore one object of this invention to provide for a method for continuously measuring the rate of decarburization and the varying carbon content of the bath during the entire decarburization process.

It is another object of this invention to provide for an arrangement for carrying out such observations and measurements.

It is still another object of this invention to provide for a method and an arrangement which are comparatively simple and entirely reliable.

With the above objects in view the invention includes a method of measuring continuously the change of the carbon content of a bath of molten metal during decarburization thereof in a decarburization vessel under formation of at least one carbon-containing gas selected from the group consisting of CO and $CO_2$, said bath of known weight having a known initial carbon content, comprising the steps of: continuously measuring the amount of gases per unit of time leaving said vessel in said decarburization process; continuously determining the CO and $CO_2$ content of said gases; and continuously determining, by continuous integration of the content of carbon-containing gas in said amounts of gases over a period of time beginning with the start of the decarburization process, the total amount of carbon removed from the bath of molten metal during such period of time, the difference between said total amount of removed carbon and the initial carbon content of the bath being an indication of the carbon content still present in the metal bath at the end of said period of time.

In another aspect of this invention there is provided an arrangement for measuring continuously the change of the carbon content of a bath of molten metal during decarburization thereof in a decarburization vessel under formation of at least one carbon-containing gas selected from the group consisting of CO and $CO_2$, comprising, in combination, gas flow measuring means for measuring continuously the amount of gases per unit of time leaving the vessel during a decarburization process; analyzing means for continuously determining the CO and $CO_2$ content of said gases leaving said vessel; and means cooperating with said gas flow measuring means and with said analyzing means and deriving from the measured amount of gases per unit of time leaving said vessel and from the determined CO and $CO_2$ content of said gases an indication of the amount of carbon per unit of time leaving said vessel in form of at least one of said carbon-containing gases.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
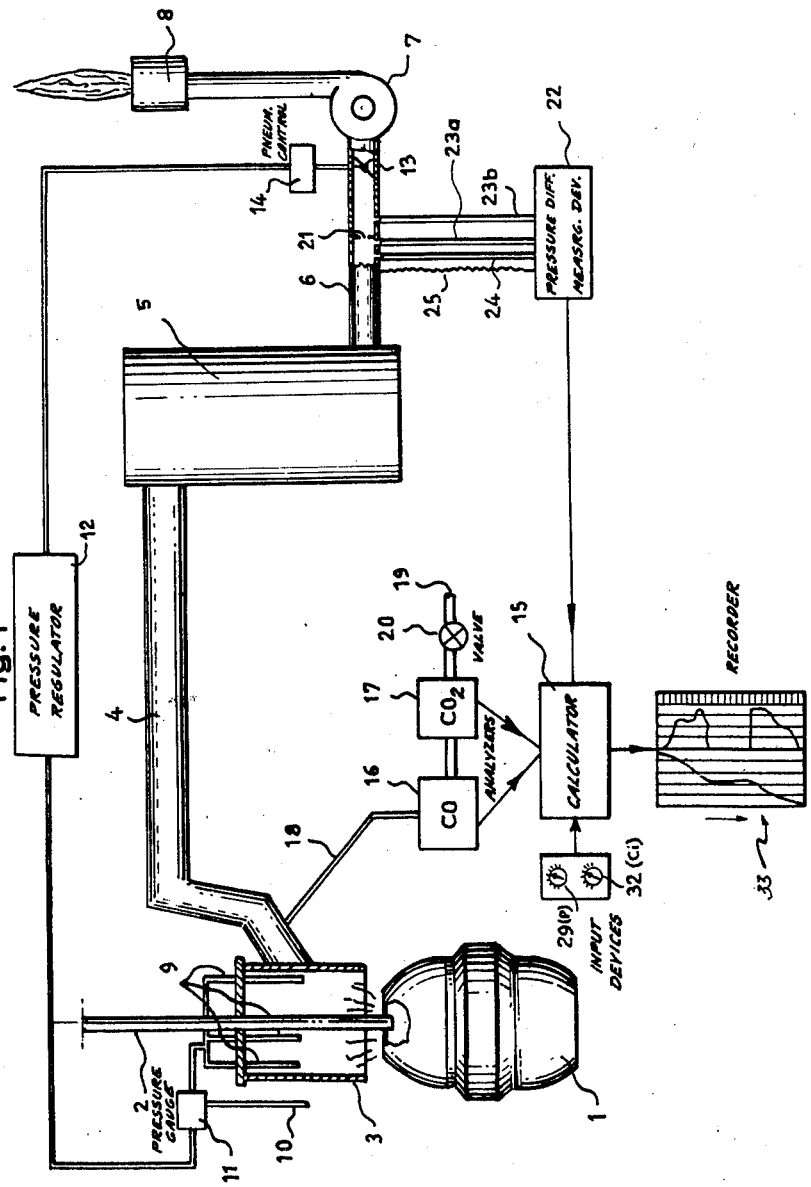
FIG. 1 is a diagrammatic illustration of an embodiment of the invention comprising a converter for the production of steel by introduction of oxygen equipped with means for collecting the escaping gases without combustion thereof.
Figure 2:
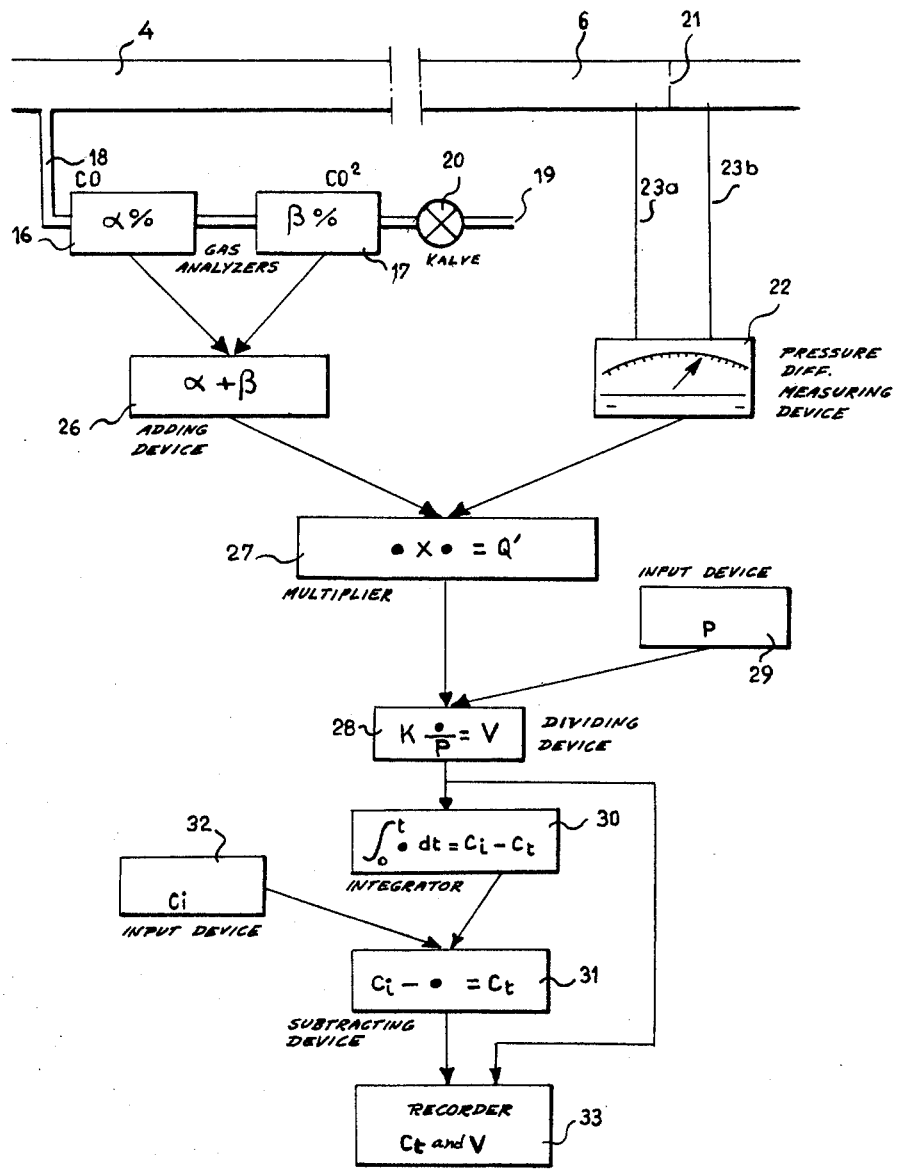
FIG. 2 is a diagram illustrating one form of the method according to the invention and also the function of the equipment illustrated in FIG. 1.

Reference is now made to FIGS. 1 and 2 which illustrate an arrangement and a method according to the invention as applied to a decarburization process in which the gases leaving the converter or decarburization vessel contain both CO and $CO_2$, the CO being subjected to combustion only at the ultimate end of the operation. It may be assumed that 5 tons of metal to be decarburized are placed in a converter or decarburization vessel 1 which may be an experimental one. The decarburization process is carried out by blowing in a well known manner oxygen, from above through a lance or tube 2 cooled by circulating water, into the vessel 1. From the bath of molten metal or rather from the vessel 1 gases escape which are predominantly composed of CO and are collected by a hood 3 cooled by circulating water (not shown) and located about 40 cm. above the vessel 1. The collected gases are sucked away through a metal duct 4 which is also cooled by means not shown e.g. by sprinkling water over it, and delivered to a dust removing sprinkler tower 5 of known type. From there the gases are sucked by means of an exhaust fan 7 through a conduit 6 and ejected through a flue 8 at the exit of which the CO is burned in order to prevent it from entering the atmosphere. In order to collect all the gases without admission of outside air and without noticeable losses the pressure in the hood 3 is always maintained at a value equal to the pressure of the surrounding atmosphere as long as the process is in operation.

This is done by means of a regulator system comprising three pressure probes 9 entering the hood 3 to about one-third of its height and assembled in parallel with a probe 10 located outside the hood for communicating with the atmosphere so as to be exposed to the atmospheric pressure at a level substantially equal to that of the open ends of the probes 9, further by means of a differential pressure gauge 11 which compares the pressure indicated by the probes 9 with the atmospheric pressure. A conventional electro-pneumatic transducer or regulator 12 supplied with the pressure indications of the gauge 11 delivers compressed air at a corresponding pressure to a pneumatic control device 14 which controls accordingly a draft regulator 13 located inside the conduit 6. Consequently, the draft regulator 13 is at any moment set in a position corresponding to the indications of the differential pressure gauge 11 in such a manner that the pressure at the lower portion of the hood 3 remains equal to the outside atmospheric pressure. It should be noted that the openings of the pressure probes 9 are not located near the lower end of the hood where they might not be always exposed to the gases leaving the vessel 1 the pressure of which is to be observed and measured.

The speed of decarburization and the carbon content of the bath of molten metal are continuously calculated by means of an electronic calculator 15 which is supplied with indications of the percentage of CO and $CO_2$ contained in the collected gases and with the indications of the volume of gases passing through the duct system per unit of time.

The percentages of CO and $CO_2$ contained in the escaping gases are measured near the exit port of the hood 3 for instance by conventional gas analyzers 16 and 17, respectively, utilizing the principle of absorption of infrared radiation. For this purpose the analyzers 16, 17 are connected with the duct 4 by a tubing 18. The required small flow of gas is released, after passing through the two analyzers 16, 17 to the atmosphere at 19, a valve 20 permitting an adjustment of the rate of flow of this amount of gas. The above mentioned analyzers operating with infra-red radiation have an acceptable speed of response of the order of 10 seconds. At present this type of analyzers is the most rapidly operating one known but evidently, if more rapidly operating analyzers are used, this can only be to the good of the process.

The total delivery per unit of time of the collected gases is measured in the conduit 6 subsequent to the cooling and dust-removing operations by means of an output metering system equipped in a well known manner with automatic corrections of factors of temperature, pressure, humidity and density. This system comprises a orifice plate 21 mounted across the conduit 6 and a pressure differential measuring device 22 connected with the conduit 6 by two pressure probes 23a and 23b as shown, a probe 24 for measuring the humidity and means 25 shown only diagrammatically, for measuring the temperature. A system of this type is entirely known so that a detailed description does not appear to be necessary.

The two analyzers 16 and 17 and the output metering systems 21–25 deliver the results of their measurements in the form of analog values i.e. in the form of electric potentials respectively proportional to the percentage contents of CO and $CO_2$ of the gases and to the total output of gases per unit of time. These electric potentials are applied to the calculator 15 whose operation will be described in reference to FIG. 2.

In FIG. 2 which illustrates diagrammatically the entire course of the method according to the invention the duct 4 and the conduit 6 as well as the analyzers 16, 17 and the output metering system comprising the diaphragm 21, the connections 23a, 23b and the differential pressure indicator 22 are shown.

The temperature and humidity probes 25 and 24 are not shown in FIG. 2.

The electrical signals delivered by the analyzers 16 and 17 representing respectively the content of $\alpha\%$ of CO and the content of $\beta\%$ of $CO_2$ in the gases flowing through the duct 4 are added in an adding device 26 which delivers, in turn, a signal proportional to the sum of $\alpha+\beta$. This signal, simultaneously with a similar signal delivered by the output metering device 22 is delivered to a multiplier 27 which furnishes a signal representing $$Q\frac{\alpha+B}{100}$$

which is the combined volumetric output per unit of time Q' of CO and of $CO_2$ Now this signal is applied to a dividing device 28 which is also supplied from an input potentiometer 29 with a voltage which represents the weight P of the metal originally placed into the vessel 1 so that the device 28 delivers a signal proportional to $$\frac{Q'}{P}k$$

which is nothing else but the speed of decarburization:

$$V=k\frac{Q'}{P}$$

wherein $k$ is a constant explained further below.

The signal V is applied to an integrator 30 furnishing a voltage which represents:

$$\frac{k}{P}\int_0^{t-} Q'dr$$

the result of this integration being obviously the amount of carbon carried away in gas form or in other words the change in carbon content of the metal bath that has occurred since the start of the decarburization operation. This change is equal to $C_i-C_t$ wherein $C_i$ is the initial carbon content of the metal bath and wherein $C_t$ is the carbon content of the bath at the end of the period of time $t$. The electrical signal representing the result of the integration $C_i-C_t$ is delivered by the integrator 30 to a subtracting device 31 to which is also supplied from an adjustable input device 32 a signal corresponding to the original carbon content $C_i$ of the metal bath. Consequently, the device 31 furnishes a final signal which represents $C_t=C_i-(C_i-C_t)$ i.e. the remaining carbon content in the metal bath at the end of the time period $t$.

Indicating means are provided for indicating the magnitude of the above mentioned signals furnished by the devices 28 and 31. Preferably the indicating means comprise an autographic recorder 33 having two tracks so that two pens record on a moving chart continuously curves illustrating the occurring changes in the speed of the decarburization and in the carbon content of the metal bath as a function of time, the chart being moved of course at a constant predetermined speed.

It is to be understood that the dividing device 28 is of course adapted to be reset to zero in a well known manner before each start of a decarburization operation. In addition, the adjustable input devices 29 and 32 which introduce signals corresponding to P and to $C_i$, respectively can be adjusted at any moment to proper values by correspondingly adjusting the potentiometers of these devices.

The above described arrangement and method yield the desired results which constitute the objects of this invention. This will be understood from the following theoretical considerations.

Assuming that at a moment $(t)$ the volume of gases per unit of time leaving the vessel 1 and the hood 3 and passing through the duct 4 is $Q(t)$ and that at the same moment the content of CO of these gases is $\alpha(t)$ and the content of $CO_2$ of these gases is $\beta(t)$ expressed in percent, then the combined volume per unit of time of CO and $CO_2$ carried away by the gases, is $$Q' = Q\frac{\alpha+\beta}{100}$$

provided that the time index $(t)$ is omitted. It is evident that if the above momentary values of the rate of the gas flow and the momentary values of the percentages of CO and $CO_2$ were integrated over a period of time starting with the beginning of the decarburization process then the result of such integration would be the total amount of CO and $CO_2$ corresponding to the amount of carbon removed from the metal bath by combustion during said process and said period of time.

Since one gram molecule of carbon namely 12 g. corresponds upon its combustion to one gram molecule or 22.4 liters of CO or of $CO_2$, or also of a mixture thereof, the combustion of 12 kg. of carbon results in the production of 22.4 m.³ of gas. Thus any given volume of CO or $CO_2$ or of a mixture thereof can be converted into the respective weight of carbon by multiplying the gas volume figure with $$\frac{12}{22.4}$$

Thus, if it is known that the weight of the amount of metal originally placed into the vessel 1 is P and its initial carbon content is $C_i$ and if $C_t$ designates the remaining carbon content in the metal bath after a period of time $t$, then the change of such carbon content during such period is $$C_i - C_t = \frac{k}{P}\int_0^t Q' dt$$

wherein $k$ is the above explained constant $$\frac{12}{22.4}$$

Consequently, the carbon content $C_t$ remaining in the bath after a period of time $t$ is $$C_t = C_i - \frac{1}{P}\cdot\frac{12}{22.4}\cdot\int_0^t Q(t)[\alpha(t)+\beta(t)]dt$$

If it is desired to define also the speed of the decarburization i.e. the proportion between the weight of carbon removed per unit of time and the original total weight of the metal then the equation applies:

$$V = k\frac{Q'}{P}$$

or $$V = \frac{1}{P}\cdot\frac{12}{22.4}\cdot[\alpha(t)+\beta(t)]Q(t)$$

It should be understood that in the above equations the speed of decarburization is defined by percent of carbon reduction of the bath per minute. If it is desired to express this speed in kilograms of carbon per ton and per minute then one has only to multiply the second half of the equations with the factor 10.

It should be undestood also that in the above the volumes of gas and the volumetric output per unit of time are taken in m.³, and the condition of the gas being normalized with respect to pressure and temperature i.e. to a condition consisting at 760 mm. of mercury and 0° C.

If the decarburization process is carried out as described above without immediate combustion of the escaping CO then the entire volume of gases passing through the duct system is substantially equal to the volume of gas leaving the vessel 1 so that the gases being subjected to measurements according to the invention namely CO and $CO_2$ are diluted very little. Consequently the measurements of the gas output per unit of time and of the CO and $CO_2$ content thereof will be highly accurate.

Figure 3:
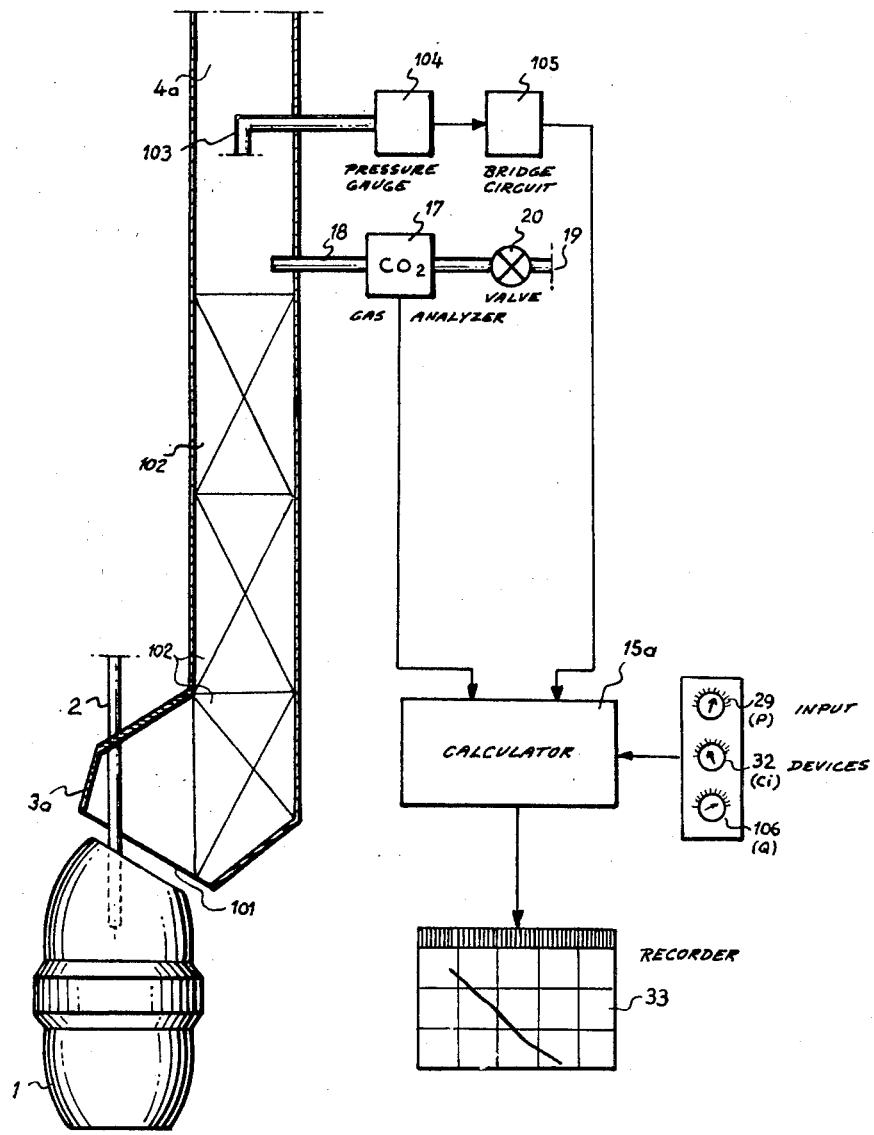
FIG. 3 is a diagrammatic illustration of a second embodiment of the invention including a converter equipped with means for introducing oxygen and with means for recuperating heat at least partly generated by combustion of escaping gases.
Figure 4:
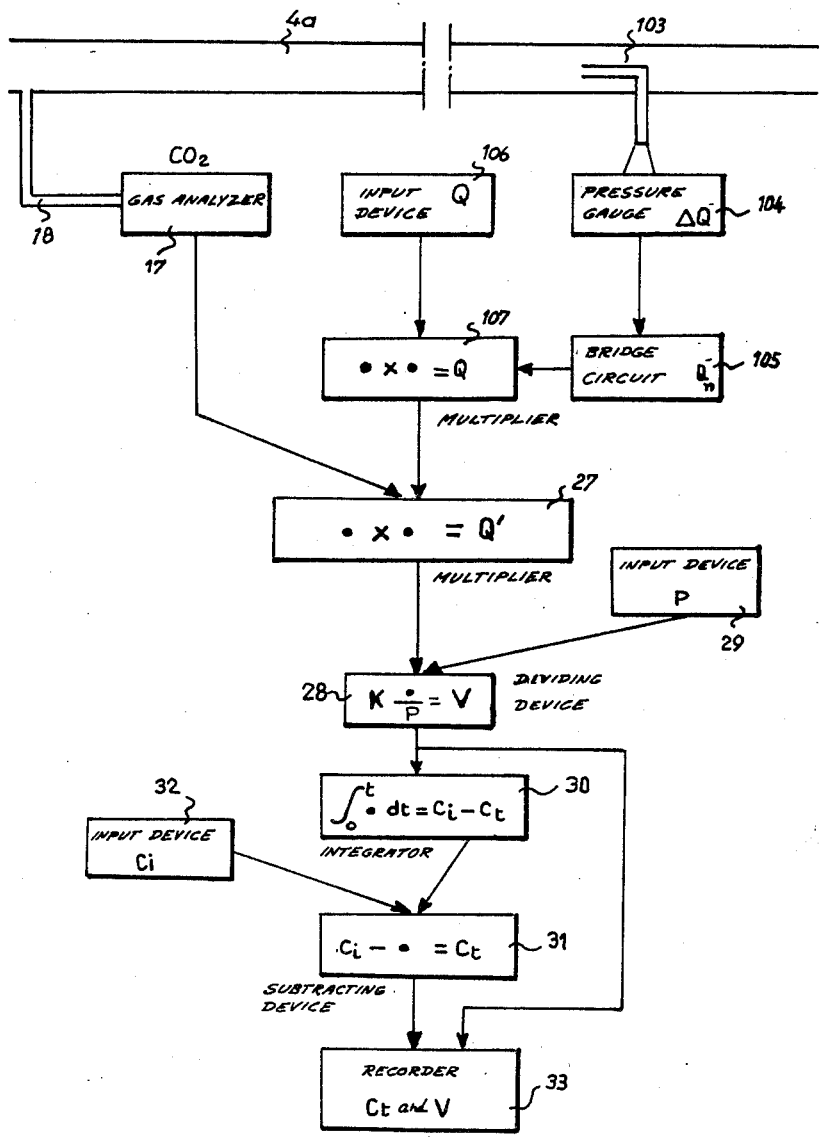
FIG. 4 is a diagram illustrating the function of the equipment shown in FIG. 3.

Reference is now made to FIGS. 3 and 4 which illustrate an arrangement and a method according to the invention as applied to a decarburization process in which the decarburization vessel or converter is equipped with means for recuperating the heat content of the gases leaving the vessel, and with means for converting the escaping CO by combustion into $CO_2$.

In this example it may be assumed that the vessel or converter 1 serves to convert molten iron into steel by means of the introduction of pure oxygen introduced by means of a lance 2 while being cooled by water circulation in a conventional manner.

Above the upper opening of the vessel 1 an exhaust hood 3a is mounted having a large opening 101 through which a substantial amount of excess air is sucked in together with the gases which escape from the vessel 1. The hood 3a leads the gases into a tubular heat recuperator or exchanger 102 shown only diagrammatically and partially since it extends upwardly in the form of a duct 4a for evacuating the gases. An exhaust fan is provided, not shown, for producing in the duct 4a a constant negative pressure so as to carry the gases away. CO contained in the gases is converted by combustion into $CO_2$ during or before its passage through the device 102. The content of $CO_2$ in the gas is measured by an analyzer 17 operating on the basis of absorption of infra-red radiation and supplied with gas through a short tubing 18. The comparatively small flow of gas required for operating the analyzer 17 is thereafter ejected into the atmosphere at 19. A valve 20 permits the adjustment of the intensity of this flow of gas.

It will be understsood that in this case the total volume of gases passing through the heat exchanger 102 and the duct 4a is very considerable and the content therein of the gas to be measured and analyzed namely the $CO_2$ constitutes a comparatively small fraction of the total volume, for example only 20 or 30%.

Consequently, it will be rather difficult to measure precisely the total output volume of gas per unit of time particularly because existing conventional installations usually contain no means for pressure or flow measurements, venturi tubes, diaphragms or the like. However, although it is rather difficult to measure the above mentioned outputs of gas per unit of time with precision, it can be stated safely that variations of these output figures remain very small, usually in the neighborhood of ±10% of a nominal value. As a matter of fact, in such existing installations there is no provision for flow or pressure regulation, while the exhaust fan usually rotates at a very constant speed. Consequently, the total output volume of gases is a fixed figure, depending only on the capacity of the exhaust fan, on one hand, and on existing losses in the installation, on the other hand. This fixed value undergoes only very small fluctuations because the losses may vary slightly with time for instance on account of contamination or incrustation of the ducts, of changing composition of the gases, of the formation of water vapor etc., but these variations remain very small. Therefore, instead of measuring the entire gas output per unit of time directly, it is much simpler to measure only the variations thereof and these need not be measured with great precision. For instance, a simple Pitot tube would yield satisfactory indications. A measurement of the nominal or normal gas output per unit of time can be carried out perfectly satisfactorily by calibrating a posteriori the entire measuring arrangement while causing the combustion of a known amount of carbon in the converter.

In accordance with the above, in the arrangement according to FIG. 3 the total volume of gas per unit of time escaping from the hood 3a is measured by a Pitot tube 103 and by a pressure gauge 104 furnishing a corresponding electric signal which is delivered to a bridge circuit 105 which furnishes a correction signal depending upon accidental variations of the volumetric output in the duct 4a.

Figure 5:
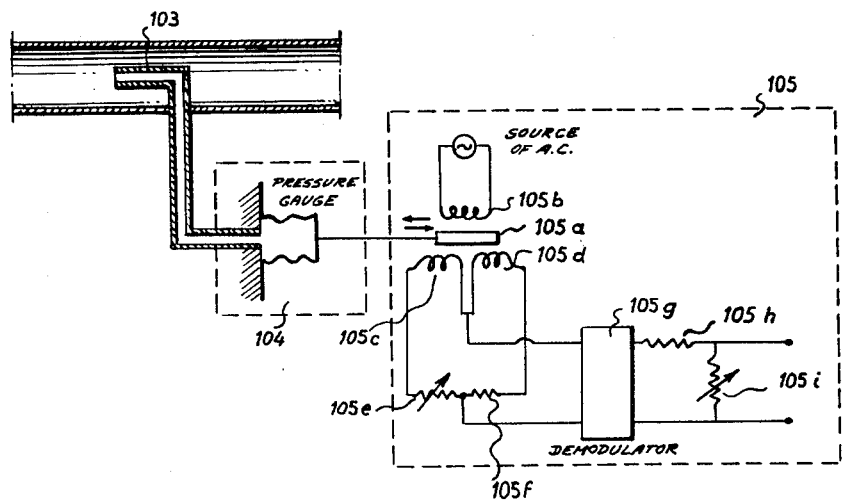
FIG. 5 is a diagrammatic illustration of a detail shown in FIGS. 3 and 4.

FIG. 5 shows with more details the arrangement of gauge 104 and bridge circuit 105. The pressure given by Pitot tube 103 is applied to gauge 104 having a diaphragm or provided with bellows, the motions of which are transmitted to an electro-magnetic transducer comprising a shifting core 105a, a primary winding 105b fed by 1000 Hz. alternating current in a known manner, and two identical symmetrical windings 105c and 105d. The windings 105c and 105d form with resistors 105e and 105f a bridge the balance of which, adjustable by means of adjustable resistor 105e, depends from the position of the magnetic core 105a, and consequently from the pressure in the Pitot tube. The voltage resulting from the unbalanced bridge is demodulated in a known manner by a known demodulator 105g. Two resistors 105h and 105i, one of which being adjustable, enable to adjust the degree of current rectification, while resistor 105e enables to adjust the null point of the bridge, and consequently to select the rate of gas flow for which the degree of rectification is null.

Also the analyzer 17 delivers an electric signal indicating the $CO_2$ content of the gases and both this signal and the output signal of the bridge circuit 105 are applied to a calculator 15a as analog voltages. Input potentiometers 29, 32 and 106 make it possible to introduce into the calculator 15a voltages respectively corresponding to the original weight P of the metal originally placed into the vessel 1, to its initial carbon content $C_i$, and to the normal or nominal volume Q per unit of time of the gas passing through the duct 4a. The result furnished by the calculator 15a namely the remaining carbon content of the metal bath at the end of varying periods of time beginning with the start of the decarburization process is furnished to an autographic recorder 33 for producing a continuous curve indicating the decrease of the original carbon content, in the same manner as described above with reference to FIGS. 1 and 2.

The operation of the calculator 15a which it quite similar to that of the calculator 15 described in reference to FIGS. 1 and 2, will now be explained in accordance with FIG. 4. It shows diagrammatically the exhaust duct 4a, the $CO_2$ analyzer 17 with its input conduit 18, the Pitot tube 103 serving to detect variations in the volumetric gas output, the pressure gauge 104 and the bridge circuit 105 furnishing correction factors. An adjustable input device 106 e.g. a potentiometer furnishes after being set accordingly a voltage which is proportional to the normal or nominal volumetric output Q. A multiplier device 107 supplied with the just mentioned potential and with a signal furnished by the correction device 105 and representing a correction factor $f$ delivers a signal representing the real volumetric gas output per unit of time:

$$Q'' = Q \cdot f$$

the correction factor $f$ usually varying only between .9 and 1.1.

A second multiplier device 27 supplied with the output signal $Q''$ and with an output signal from the analyzer 17 representing the percentage content $\beta\%$ of $CO_2$ in the gas passing through the duct 4a produces a signal representing:

$$Q' = Q'' \cdot \frac{\beta}{100}$$

From hereon the remainder of the calculator 15a is quite similar to the corresponding portion of the above described calculator 15.

The signal representing $Q'$ is applied to a dividing device 28 which is also supplied from an input potentiometer 29 with a voltage which represents the weight P of the metal originally placed into the vessel 1 so that the device 28 delivers a signal proportional to $$\frac{Q'}{P} R$$

which is nothing else but the speed of decarburization:

$$V = K \frac{Q'}{P}$$

The signal V is applied to an integrator 30 furnishing a voltage which represents $$\frac{K}{P} \int_0^t Q' dt$$

the result of this integration being the amount of carbon carried away in gas form that is the change in carbon content of the metal bath that has occured since the start of the decarburization operation, this charge being equal to $C_i - C_t$ as in the case of calculator 15.

The output signal from the device 30 is supplied to a subtracting device 31 to which is also supplied from the adjustable input device 32 a signal representing the original carbon content $C_i$ of the metal bath. Consequently, the subtracting device 31 produces a signal representing $$C_t = C_i - (C_i - C_t)$$

Thus, the output of the device 31 is an indication of the remaining carbon content in the metal bath after a period of time $t$ after the beginning of the decarburization operation. This indication may be transmitted to the autographic recorder 33 for continuously recording and indicating the variation of the carbon content in the metal bath and the occurring changes in the speed of the decarburization.

For obvious reasons, the integrator 30 must be reset to zero at the beginning of every decarburization operation. It is to be noted that, in comparison with the arrangement according to FIG. 2, the relative positions of the devices 28 and 30 are reversed, and that the recorder 33 will record only one curve.

It does not appear to be necessary to explain the theoretical basis of the method illustrated by FIG. 4 because it is essentially the same as that applied to the method illustrated by FIG. 2. However, since in the method according to FIG. 3 no CO is present in the gases passing through the duct 4a the equations are simplified in the same manner as the arrangement is simplified because the CO content is reduced to 0%. On the other hand, since the total volume of gases per unit of time is not measured but only the variations of a known normal or norminal volumetric output, the measured value Q is replaced by the calculated value Q."

If desired, the speed of decarburization would be indicated by the output signal of the device 28 fundamentally in the same manner as described above for the method according to FIG. 2 except that in this case the corresponding equation would read:

$$V' = \frac{1}{P} \cdot \frac{12}{22.4} \cdot \beta(t) Q''(t) = C_i - C_t$$

It will be understood that each of the elements described above, or two or more together, may also find a useful application in other types of a method and an arrangement for measuring continuously the change of the carbon content of a bath of molten metal differing from the types described above.

While the invention has been illustrated and described as embodied in a method and an arrangement for measuring continuously the change of the carbon content of a bath of molten metal during decarburization thereof in a decarburization vessel, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of measuring continuously the change of the carbon content of a bath of molten metal during decarburization thereof in a decarburization vessel under formation of CO and $CO_2$ in the absence of combustion of the CO subsequent to its formation, said bath of known weight having a known initial carbon content, comprising the steps of: continuously automatically determining the amount of gases per unit of time leaving said vessel in said decarburization process; continuously automatically determining the CO and $CO_2$ content of said gases; and continuously determining, by continuous integration of the content of CO and $CO_2$ in said amounts of gases over a period of time beginning with the start of the decarburization process, the corresponding total amount of carbon removed from the bath of molten metal during such period of time, the difference between said total amount of removed carbon and the initial carbon content of the bath being an indication of the carbon content still present in the metal bath at the end of said period of time.

2. A method of measuring continuously the change of the carbon content of a bath of molten metal during decarburization thereof in a decarburization vessel under formation of CO and $CO_2$ in the absence of combustion of the CO subsequent to its formation, said bath of known weight having a known initial carbon content, comprising the steps of: continuously automatically determining the amount of gases per unit of time leaving said vessel in said decarburization process; continuously automatically determining the CO and $CO_2$ content of said gases; and continuously determining, from the content of CO and $CO_2$ in said amounts of gases emerging per unit of time, the corresponding speed of removal of carbon from the bath of molten metal during such period of time.

3. A method of measuring continuously the change of the carbon content of a bath of molten metal during decarburization thereof in a decarburization vessel under formation of CO and $CO_2$ with introduction of air by aspiration into the mixture of CO and $CO_2$ and ensuing combustion of the CO, said bath of known weight having a known initial carbon content, comprising the steps of: determining a fixed value representing the normal volumetric output per unit of time of gases containing air and $CO_2$ resulting from the decarburization process; continuously automatically determining occurring variations of said normal volumetric output of said gases for obtaining by corresponding correction of said fixed value the real volumetric output of said gases per unit of time; continuously automatically determining the $CO_2$ content of said gases; and continuously determining, by continuous integration of the content of $CO_2$ in said amounts of gases over a period of time beginning with the start of the decarburization process, the corresponding total amount of carbon removed from the bath of molten metal during such period of time, the difference between said total amount of removed carbon and the initial carbon content of the bath being an indication of the carbon content still present in the metal bath at the end of said period of time.

4. A method of measuring continuously the change of the carbon content of a bath of molten metal during decarburization thereof in a decarburization vessel under formation of CO and $CO_2$ with introduction of air by aspiration into the mixture of CO and $CO_2$ and ensuing combustion of the CO, said bath of known weight having a known initial carbon content, comprising the steps of: determining a fixed value representing the normal volumetric output per unit of time of gases containing air and $CO_2$ resulting from the decarburization process; continuously automatically determining occurring variations of said normal volumetric output of said gases for obtaining by corresponding correction of said fixed value the real volumetric output of said gases per unit of time; continuously automatically determining the $CO_2$ content of said gases; and continuously determining, from the content of $CO_2$ in said amounts of gases emerging per unit of time, the corresponding speed of removal of carbon from the bath of molten metal during such period of time.

5. An arrangement for measuring continuously the change of the known initial carbon content of a bath of molten metal during decarburization thereof in a decarburization vessel under formation of at least one carbon-containing gas selected from the group consisting of CO and $CO_2$, comprising, in combination, gas flow measuring means for measuring continuously the amount of gases per unit of time leaving the vessel during a decarburization process; analyzing means for continuously determining the CO and $CO_2$ content of said gases leaving said vessel; and electric calculator means cooperating with said gas flow measuring means and with said analyzing means and deriving from the measured amount of gases per unit of time leaving said vessel and from the determined CO and $CO_2$ content of said gases an indication of the amount of carbon per unit of time leaving said vessel in the form of at least one of said carbon-containing gases.

6. An arrangement for measuring continuously the change of the known initial carbon content of a bath of molten metal during decarburization thereof in a decarburization vessel under formation of at least one carbon-containing gas selected from the group consisting of CO and $CO_2$, comprising, in combination, gas flow measuring means for measuring continuously the amount of gases per unit of time leaving the vessel during the decarburization process; analyzing means for continuously determining the CO and $CO_2$ content of said gases leaving said vessel; and electric calculator means cooperating with said gas flow measuring means and with said analyzing means and comprising integrator means for deriving from the measured amount of gases per unit of time leaving said vessel and from the determined CO and $CO_2$ content of said gases an indication of the corresponding total amount of carbon removed from the bath of molten metal in form of at least one of said carbon-containing gases during a given period of time beginning with the start of the decarburization process, and means for forming a difference between said total amount of carbon and the known initial carbon content thereof, said difference being an indication of the remaining carbon content of said bath at the end of said period of time.

7. An arrangement as claimed in claim 5, said gas flow measuring means being equipped with devices for automatically adjusting the obtained measurements by compensating at least variations of temperature and pressure of said gases, and furnishing a first electric signal proportionally representing the adjusted momentary value $Q(t)$ of said amount of gases per unit of time; said analyzing means being quick-responding and furnishing second electric signals proportionally representing the momentary values $\alpha(t)\%$ of said CO content and $\beta(t)\%$ of said $CO_2$ content; said calculator means including adjustable input means for introducing an electric potential proportional to the known initial weight P in kilograms of the metal in the bath, and deriving from said first and second signals and said potential an output signal defined as $$V = \frac{1}{P} \cdot \frac{12}{22.4} \cdot [\alpha(t) + \beta(t)] \cdot Q(t)$$

wherein V is the speed of removal of carbon from the metal bath in percent of carbon content of P per minute, and autographic recorder means for continuously recording the amplitudes of said output signal representing V.

8. An arrangement for measuring continuously the change of the known initial carbon content of a bath of molten metal during decarburization thereof in a decarburization vessel under formation of CO and $CO_2$ with introduction of air by aspiration into the mixture of CO and $CO_2$ and ensuing combustion of the CO, the normal volumetric output per unit of time of gases containing air and $CO_2$ being a known value, comprising in combination, gas flow measuring means for measuring continuously occurring variations of said normal volumetric output of gases and furnishing a first electric signal representing such variations; quick-response analyzing means for continuously determining the $CO_2$ content of said gases leaving said vessel and furnishing a second electric signal proportionally representing the momentary value $\beta(t)\%$ of said $CO_2$ content; and electric calculator means cooperating with said gas flow measuring means and with said analyzing means including adjustable input means for introducing an electric potential proportional to the known normal volumetric output per unit of time of said gases containing air and $CO_2$, means for modifying said potential by combination with said first electric signal so as to furnish a third electric signal proportionally representing the real volumetric output per unit of time of said gases $Q''$, means for deriving from said second and third signals a fourth signal proportionally representing the volumetric amount $Q'$ of $CO_2$ per unit of time contained in said gases, second adjustable input means for introducing a second electric potential proportional to the known initial weight P in kilograms of the metal in the bath, and means for deriving from said second electric potential and said fourth electric signal an output signal defined as $$V = \frac{1}{P} \cdot \frac{12}{22.4} \cdot \beta(t) \cdot Q''$$

wherein V is the speed of removal of carbon from the metal bath in percent of carbon content of P per minute, and autographic recorder means for continuously recording the amplitudes of said output signal representing V.

9. An arrangement as claimed in claim 7, wherein said electric calculator means further include additional adjustable input means for introducing an additional electric potential proportional to the known carbon content of said amount P of metal in said bath, and means for continuously deriving from said output signal representing V and from said additional electric potential a signal defined by $$C_t = C_i - \frac{1}{P} \cdot \frac{12}{22.4} \cdot \int_0^t Q(t)[\alpha(t) + \beta(t)] dt$$

wherein $C_t$ is the carbon content of said metal bath at the end of a period of time $t$ beginning with the start of the decarburization process in percent of P and wherein $C_i$ is the corresponding original carbon content of said metal bath.

10. An arrangement as claimed in claim 8, wherein said electric calculator means further include additional adjustable input means for introducing an additional electric potential proportional to the known carbon content of said amount P of metal in said bath, and means for continuously deriving from said output signal representing V and from said additional electric potential a signal defined by $$C_t = C_i \frac{1}{P} \cdot \frac{12}{22.4} \cdot \int_0^t \beta(t) \cdot Q'' dt$$

wherein $C_t$ is the carbon content of said metal bath at the end of a period of time $t$ beginning with the start of the decarburization process in percent of P and wherein $C_i$ is the corresonding original carbon content of said metal bath, and autographic recorder means for continuously recording the amplitudes of said signal representing $C_t$.

11. An arrangement as claimed in claim 5, said gas flow measuring means being equipped with devices for automatically adjusting the obtained measurements by compensating at least variations of temperature and pressure of said gases, and furnishing a first electric signal proportionally representing the adjusted momentary value $Q(t)$ of said amount of gases per unit of time; said analyzing means being quick-responding and furnishing second electric signals proportionally representing the momentary values $\alpha(t)\%$ of said CO content and $\beta(t)\%$ of said $CO_2$ content; and said calculator means including adjustable input means for introducing an electric potential proportional to the known initial weight P in kilograms of the metal in the bath, and deriving from said first and second signals and said potential an output signal defined as $$V = \frac{1}{P} \cdot \frac{12}{22.4} \cdot [\alpha(t) + \beta(t)] \cdot Q(t)$$

wherein V is the speed of removal of carbon from the metal bath in percent of carbon content of P per minute.

12. An arrangement for measuring continuously the change of the known initial carbon content of a bath of molten metal during decarburization thereof in a decarburization vessel under formation of CO and $CO_2$ with introduction of air by aspiration into the mixture of CO and $CO_2$ and ensuing combustion of the CO, the normal volumetric output per unit of time of gases containing air and $CO_2$ being a known value, comprising, in combination, gas flow measuring means for measuring continuously occurring variations of said normal volumetric output of gases and furnishing a first electric signal representing such variations; quick-response analyzing means for continuously determining the $CO_2$ content of said gases leaving said vessel and furnishing a second electric signal proportionally representing the momentary value $\beta(t)\%$ of said $CO_2$ content; and electric calculator means cooperating with said gas flow measuring means and with said analyzing means including adjustable input means for introducing an electric potential proportional to the known normal volumetric output per unit of time of said gases containing air and $CO_2$, means for modifying said potential by combination with said first electric signal so as to furnish a third electric signal proportionally representing the real volumetric output per unit of time of said gases $Q''$, means for deriving from said second and third signals a fourth signal proportionally representing the volumetric amount $Q'$ of $CO_2$ per unit of time contained in said gases, second adjustable input means for introducing a second electric potential proportional to the known initial weight P in kilograms of the metal in the bath, and means for deriving from said second electric potential and said fourth electric signal an output signal defined as $$V = \frac{1}{P} \cdot \frac{12}{22.4} \cdot \beta(t) \cdot Q''$$

wherein V is the speed of removal or carbon from the metal bath in percent of carbon content of P per minute.

13. An arrangement as claimed in claim 7, wherein said electric calculator means further include additional adjustable input means for introducing an additional electric potential proportional to the known carbon content of said amount P of metal in said bath, and means for continuously deriving from said output signal representing V and from said additional electric potential a signal defined by $$C_t = C_i - \frac{1}{P} \cdot \frac{12}{22.4} \cdot \int_0^t Q(t)[\alpha(t) + \beta(t) dt]$$

wherein $C_t$ is the carbon content of said metal bath at the end of a period of time $t$ beginning with the start of the decarburization process in percent of P and wherein $C_i$ is the corresponding original carbon content of said metal bath, and autographic recorder means for continuously recording the amplitudes of said signal representing $C_t$.

14. An arrangement as claimed in claim 8, wherein said electric calculator means further include additional adjustable input means for introducing an additional electric potential proportional to the known carbon content of said amount P of metal in said bath, and means for continuously deriving from said output signal representing V and from said additional electric potential a signal defined by $$C_t = C_i - \frac{1}{P} \frac{12}{22.4} \int_0^t \beta(t) \cdot Q'' dt$$

wherein $C_t$ is the carbon content of said metal bath at the end of a period of time $t$ beginning with the start of the decarburization process in percent of P and wherein $C_i$ is the corresponding original carbon content of said metal bath.

15. A method of measuring continuously the change of the carbon content of a bath of molten metal during decarburization thereof in a decarburization vessel under formation of at least one carbon-containing gas selected from the group consisting of CO and $CO_2$, said bath of known weight having a known initial carbon content, comprising the steps of: continuously automatically determining the amount of gas per unit of time leaving said vessel in said decarburization process; continuously automatically determining the content of the carbon-containing gas in said amount of gas leaving said vessel; and continuously determining, by continuous integration of said content of carbon-containing gas in said amounts of gas over a period of time beginning with the start of the decarburization process, the corresponding total amount of carbon removed from the bath of molten metal during such period of time, the difference between said total amount of removed carbon and the initial carbon content of the bath being an indication of the carbon content still present in the metal bath at the end of said period of time.

16. An arrangement for measuring continuously the change of the known initial carbon content of a bath of molten metal during decarburization thereof in a decarburization vessel under formation of at least one carbon-containing gas selected from the group consisting of CO and $CO_2$, comprising, in combination, gas flow measuring means for measuring continuously the amount of gas per unit of time leaving the vessel during a decarburization process; analyzing means for continuously determining the content of the carbon-containing gas in said amount of gas leaving said vessel; and electric calculator means cooperating with said gas flow measuring means and with said analyzing means and deriving from the measured amount of gas per unit of time leaving said vessel and from the determined content of carbon-containing gas in said amount of gases leaving said vessel an indication of the amount of carbon per unit of time leaving said vessel in form of at least one of said carbon-containing gases.

17. A method of measuring continuously the change of the carbon content of a bath of molten metal during decarburization thereof in a decarburization vessel under formation of at least one carbon-containing gas selected from the group of carbon-containing gases consisting of CO and $CO_2$, said bath of known weight having a known initial carbon content, comprising the steps of: continuously automatically determining the amount of gas per unit of time leaving said vessel in said decarburization process; continuously automatically determining the content of all of said carbon-containing gases present in said amount of gas leaving said vessel, said content of carbon-containing gas being indicative of the speed characteristic of the removal of carbon from said metal bath and of the amount characteristic of carbon still present in said metal bath; and continuously automatically determining from said content of carbon-containing gas at least one of said characteristics.

18. An arrangement for measuring continuously the change of the known initial carbon content of a bath of molten metal during decarburization thereof in a decarburization vessel under formation of at least one carbon-containing gas selected from the group of carbon-containing gases consisting of CO and $CO_2$, comprising, in combination, gas flow measuring means for determining continuously the amount of gas per unit of time leaving the vessel during a decarburization process; analyzing means for continuously determining the content of all of said carbon-containing gases present in said amount of gas leaving said vessel, said content of carbon-containing gas being indicative of the speed characteristic of the removal of carbon from said metal bath and of the amount characteristic of carbon still present in said metal bath; and electric calculator means cooperating with said gas flow measuring means and with said analyzing means and deriving from the determined amount of gas per unit of time leaving said vessel and from the determined content of carbon-containing gas in said amount of gas leaving said vessel at least one of said characteristics.

19. A method of measuring continuously the change of the carbon content of a bath of molten metal during decarburization thereof in a decarburization vessel under formation of at least one carbon-containing gas selected from the group of carbon-containing gases consisting of CO and $CO_2$, said bath of known weight having a known initial carbon content, comprising the steps of: continuously automatically determining the amount of gas per unit of time leaving said vessel in said decarburization process; continuously automatically determining the relative content of all of said carbon-containing gases present in said amount of gas per unit of time leaving said vessel; continuously automatically determining, from the relative content of carbon-containing gas contained in said amount of gas emerging per unit of time, the corresponding speed of removal of carbon from the bath of molten metal during a given period of time; and continuously automatically determining by continuous integration of said relative content of said carbon-containing gas in said amount of gas over a period of time beginning with the start of the decarburization process the corresponding total amount of carbon removed from the bath of molten metal during such period of time, the difference between said total amount of removed carbon and the initial carbon content of the bath being an indication of the carbon content still present in the metal bath at the end of said period of time.

20. An arrangement for measuring continuously the change of the initial carbon content of a bath of molten metal during decarburization thereof in a decarburization vessel under formation of at least one carbon-containing gas selected from the group of carbon-containing gases consisting of CO and $CO_2$, comprising, in combination, gas flow measuring means for measuring continuously the amount of gas per unit of time leaving the vessel during a decarburization process; analyzing means for continuously determining the relative content of all of said carbon-containing gases present in said amount of gas per unit of time leaving said vessel; and electric calculator means cooperating with said gas flow measuring means and with said analyzing means and determining by integration of said relative content of carbon-containing gas in said amount of gas over a period of time beginning with the start of the decarburization process the corresponding total amount of carbon removed from the bath of molten metal during such period of time and, by subtraction from the initial carbon content of said bath, the carbon content still present in said bath at the end of said period of time, and deriving from the measured amount of gas per unit of time leaving said vessel and from the determined content of carbon-containing gas therein the speed of removal of carbon from said bath of metal.

21. A method of measuring continuously the amount of carbon-containing gas leaving a decarburization vessel per unit of time in the total amount of gas leaving said vessel during decarburization of a bath of molten metal in said vessel, comprising the steps of: continuously automatically determining the total volume of gas leaving said vessel per unit of time; continuously automatically determining the percentage content of carbon-containing gas in said total volume of gas leaving said vessel; and continuously automatically determining the product of said total volume of gas leaving said vessel per unit of time and the value of said percentage of content of carbon-containing gas in said gas leaving said vessel, which product is indicative of the amount in volume of carbon-containing gas leaving said vessel per unit of time.

22. A method of measuring continuously the amount of carbon-containing gas leaving a decarburization vessel per unit of time in the total amount of gas leaving said vessel during decarburization of a bath of molten metal in said vessel, and the amount of carbon contained therein, comprising the steps of: continuously automatically determining the total volume of gas leaving said vessel per unit of time; continuously automatically determining the percentage content of carbon-containing gas in said total volume of gas leaving said vessel; and continuously automatically determining the product of said total volume of gas leaving said vessel per unit of time and the value of said percentage of content of carbon-containing gas in said gas leaving said vessel, which product is indicative of the amount in volume of carbon-containing gas leaving said vessel per unit of time and of the amount of carbon contained therein in view of the known fixed ratio between the weight of a given amount of carbon and the volume of carbon-containing gas resulting from the combustion of said amount of carbon.

23. An arrangement for measuring continuously the amount of carbon-containing gas leaving a decarburization vessel per unit of time in the total amount of gas leaving said vessel during decarburization of a bath of molten metal in said vessel, comprising, in combination, conduit means for delivering gas leaving said vessel; gas flow measuring means connected with said conduit means for determining continuously the total volume of gas leaving said vessel per unit of time; analyzing means connected with said conduit means for continuously determining the percentage content of carbon-containing gas in said total volume of gas leaving said vessel; and electric calculator means cooperating with said gas flow measuring means and with said analyzing means and forming the product of said total volume of gas leaving said vessel determined by said gas flow measuring means and of said percentage determined by said analyzing means which product is indicative of the amount in volume of carbon-containing gas leaving said vessel per unit of time.

24. An arrangement for measuring continuously the amount of carbon-containing gas leaving a decarburization vessel per unit of time in the total amount of gas leaving said vessel during decarburization of a bath of molten metal in said vessel, comprising, in combination, conduit means for delivering gas leaving said vessel; gas flow measuring means connected with said conduit means for determining continuously the total volume of gas leaving said vessel per unit of time and including orifice plate means across said conduit means and electrical means for determining the pressure differential between upstream and downstream sides of said orifice plate means and furnishing accordingly a first electrical signal being an analog representation of said total volume of gas passing through said conduit means across which said orifice plate means is located; analyzing means connected with said conduit means for continuously determining the percentage content of carbon-containing gas in said total volume of gas leaving said vessel and including electrical means for furnishing a second electrical signal being an analog representation of said percentage; and electric calculator means cooperating with said gas flow measuring means and with said analyzing means and forming from said first and second electrical signals an output signal being an analog representation of the product of said total volume of gas leaving said vessel determined by said gas flow measuring means and of said percentage determined by said analyzing means which product is indicative of the amount in volume of carbon-containing gas leaving said vessel per unit of time.

25. An arrangement for measuring continuously the amount of carbon-containing gas leaving a decarburization vessel per unit of time in the total amount of gas leaving said vessel during decarburization of a bath of molten metal in said vessel, comprising, in combination, conduit means for delivering gas leaving said vessel; gas flow measuring means connected with said conduit means for determining continuously the total volume of gas leaving said vessel per unit of time and including Pitot tube means in said conduit means and electrical means for determining the velocity heat at said Pitot tube means and furnishing accordingly a first electrical signal being an analog representation of said total volume of gas passing through said conduit means; analyzing means connected with said conduit means for continuously determining the percentage content of carbon-containing gas in said total volume of gas leaving said vessel and including electrical means for furnishing a second electrical signal being an analog representation of said percentage; and electric calculator means cooperating with said gas flow measuring means and with said analyzing means and forming from said first and second electrical signals an output signal being an analog representation of the product of said total volume of gas leaving said vessel determined by said gas flow measuring means and of said percentage determined by said analyzing means which product is indicative of the amount in volume of carbon-containing gas leaving said vessel per unit of time.

References Cited by the Examiner
UNITED STATES PATENTS
2,977,217  3/61  Graef et al. _____ 75—60

RICHARD C. QUEISSER, *Primary Examiner.*

JOSEPH P. STRIZAK, *Examiner.*